United States Patent [19]

Dangl et al.

[11] Patent Number: 5,066,040
[45] Date of Patent: Nov. 19, 1991

[54] MOTOR VEHICLE ROLLOVER BAR DRIVING SYSTEM

[75] Inventors: Wolfgang Dangl, München; Gerald Schick, Unterschleissheim; Reinhard Nowack; Gerhard Reuber, both of Drolshagen, all of Fed. Rep. of Germany

[73] Assignee: Bayerische Motoren Werke Aktiengesellschaft, Fed. Rep. of Germany

[21] Appl. No.: 561,601

[22] Filed: Aug. 2, 1990

[30] Foreign Application Priority Data

Aug. 2, 1989 [DE] Fed. Rep. of Germany ....... 3925513

[51] Int. Cl.$^5$ .............................................. B60R 21/13
[52] U.S. Cl. ..................................... 280/756; 180/271
[58] Field of Search ........................ 280/756; 180/271; 291/190, 205, 102, 210

[56] References Cited

U.S. PATENT DOCUMENTS

| 4,601,487 | 7/1986 | Hoffman | 280/756 |
| 4,676,524 | 6/1987 | Ball et al. | 280/756 |
| 4,830,402 | 5/1989 | Matthias et al. | 280/756 |

FOREIGN PATENT DOCUMENTS

| 3914036 | 4/1990 | Fed. Rep. of Germany | 280/756 |
| 1159594 | 7/1969 | United Kingdom |  |

Primary Examiner—Kenneth R. Rice
Attorney, Agent, or Firm—Evenson, Wands, Edwards, Lenahan & McKeown

[57] ABSTRACT

Rollover protection for occupants of a convertible motor vehicle is formed by two rollover bars which are disposed on a base plate and can be swivelled around swivel axes extending approximately in the longitudinal direction of the vehicle, approximately in the plane of the base plate. At the base plate which is installed largely in the transverse direction of the vehicle and approximately perpendicularly to the longitudinal direction, control elements for the swivelling of the rollover bars, as well as the triggering mechanisms and the locking devices for the extended rollover bars, are disposed. The rollover protection system can be pre-assembled easily, and the adjustability of all driving and locking elements is good. As a result of the flat construction, the system requires little installation space and permits a favorable moving direction of the rollover bars during the extending operation.

26 Claims, 2 Drawing Sheets

FIG.1

MOTOR VEHICLE ROLLOVER BAR DRIVING SYSTEM

CROSS-REFERENCE TO RELATED APPLICATIONS

This application is related to application Ser. No. 07/561,603, filed on Aug. 2, 1990, in the name of Dieter Pfandzeder, Wolfgang Dangl, Klaus Kapitza, Martin Wegge, Hagen Schneider, Reinhard Nowack and Gerhard Reuber, and entitled "A MOTOR VEHICLE HAVING A ROLLOVER BAR".

BACKGROUND AND SUMMARY OF THE INVENTION

The present invention relates to a driving system for a rollover bar of a motor vehicle and, more particularly, to a driving system for a rollover bar in a convertible which can be displaced from a lowered position to a supporting position and back.

In the case of a known driving system of the type shown in DE-PS 37 32 562, a U-shaped bar which extends essentially in the transverse direction of the vehicle for the purpose of an arbitrary adjustment is actuated at both leg ends by one spring-loaded sensor-controlled piston cylinder unit and one piston cylinder unit, that can be acted upon hydraulically, respectively. The adjusting mechanisms for the rollover bar are difficult to house within the vehicle concept. They have a complicated construction, and their adjustment is expensive and sensitive, for example, in the case of distortions of the vehicle or the like.

It is an object of the present invention to provide a driving system for a rollover bar of a motor vehicle of the above-mentioned type which, together with the complete bar system, is easy to integrate into the vehicle and can also be adjusted easily. The drive must also be uncomplicated, and its operation must nevertheless be reliable.

This object has been achieved in accordance with the present invention by providing the rollover bar disposed on a base plate which can be fastened to the vehicle body. The control elements, the holding mechanism and the locking device advantageously are also arranged on this base plate. The base plate preferably extends in the transverse direction of the vehicle in an at least approximately perpendicular plane and, in its lateral areas, provides the bearing for two rollover bars which can be swivelled in a plane which is parallel to the base plate. In this manner, the two rollover bars, together with their holding mechanisms and their locking devices, may be mounted particularly easily outside the vehicle and may be precisely adjusted. The construction requires little installation space in the vehicle and may be fixed in the vehicle in such a manner that minor deformations of the vehicle, such as distortions, have almost no influence on the adjustment and thus on the operational reliability.

BRIEF DESCRIPTION OF THE DRAWINGS

These and other features, objects and advantages of the present invention will become more readily apparent from the following detailed description of a presently preferred embodiment when taken in conjunction with the accompanying drawings wherein.

DETAILED DESCRIPTION OF THE DRAWINGS

Figure 1:
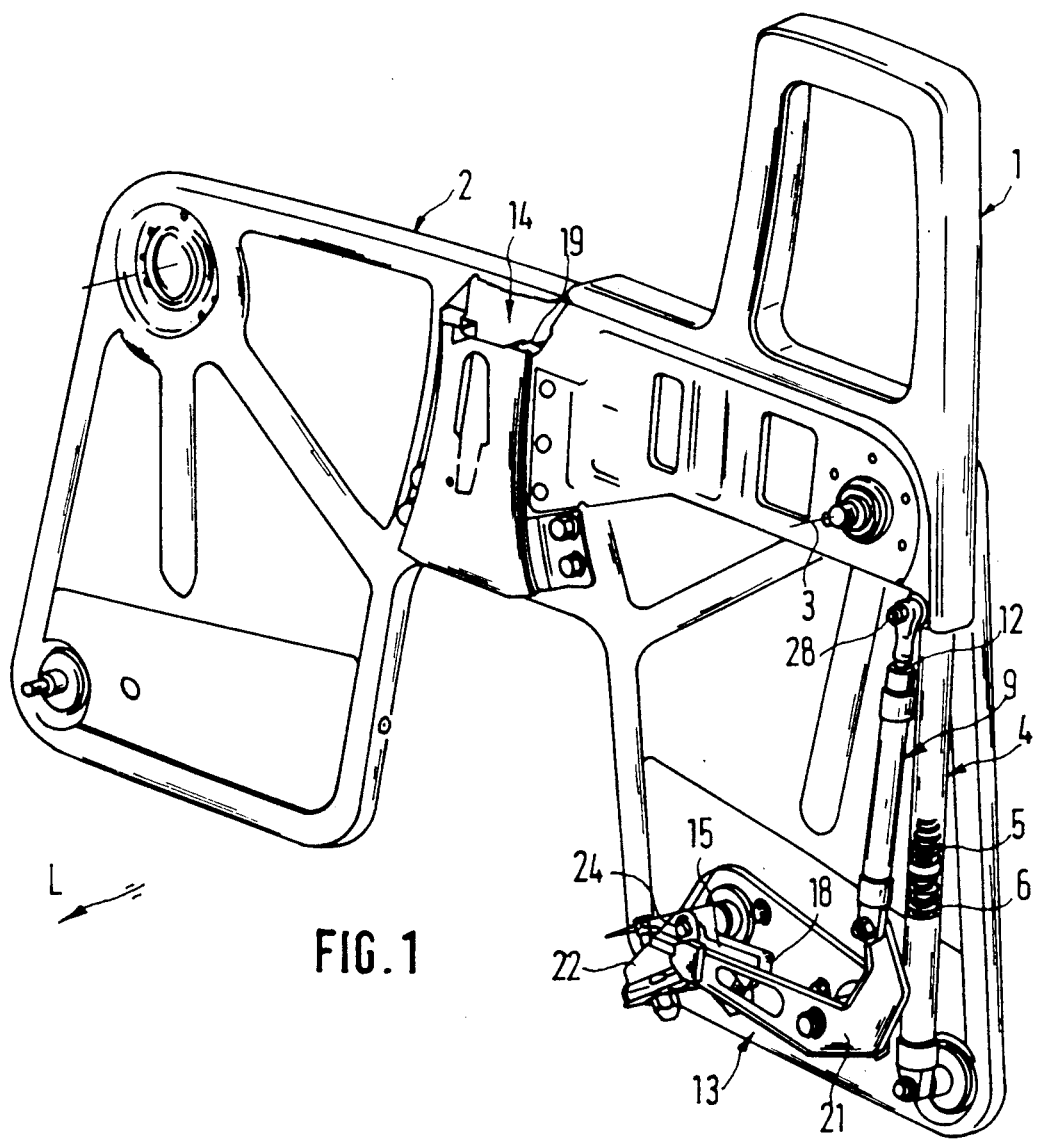
FIG. 1 is a perspective view of a base plate to be provided with upright rollover bars (only one of which is shown), with the driving elements which are essential for its operation.

In FIG. 1, only one rollover bar 1 is shown on the right half of a base plate 2, and the left rollover bar is not shown. The right-half rollover bar 1 is shown in its upwardly directed supporting position from where it can be displaced into the lowered position shown in FIG. 2 by the other second rollover bar 1. The illustrated embodiment concerns swivelling rollover bars 1 which can swivelled around swivel axes 3 which are at least approximately in parallel with respect to the longitudinal direction of the vehicle L. The rollover bars may, however, also be displaceable by way of other guides, for example, translationally, on a base plate which has a slightly different construction.

Figure 2:
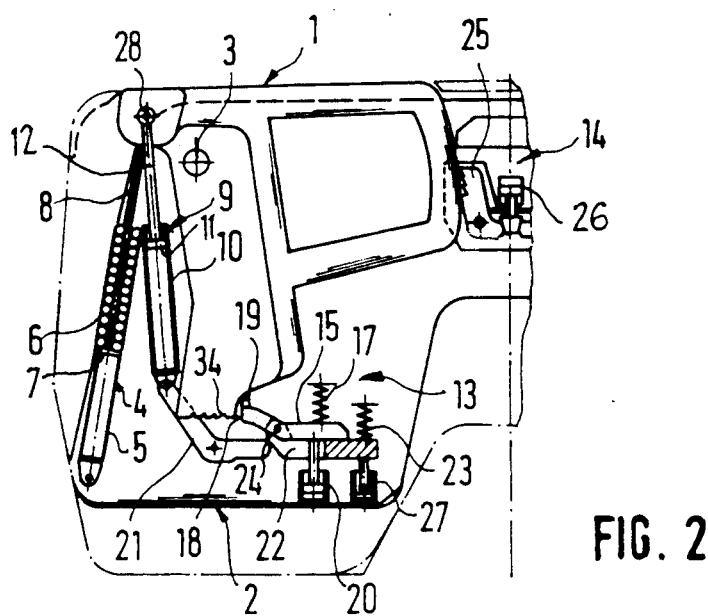
FIG. 2 is a partially schematic longitudinal view of the left half of the base plate shown in FIG. 1 with a swivelled-in (i.e., lowered) left rollover bar.

From the lowered position of the bar 1 shown in FIG. 2, the rollover bars 1, under the effect of a sensor-controlled control element 4, can be swivelled into the upwardly directed supporting position shown in FIG. 1. The control element 4 comprises a sleeve 5 in which a pressure spring 6 is arranged which has one end which supports itself at an upper sleeve cover and another end at a piston-type plate 7 of a pull rod 8 which can be displaced in the sleeve and extends to the outside through the top cover.

The control element 9, which in the illustrated embodiment is formed by a double-action hydraulic cylinder 10 with a piston rod 12 that can be actuated by a piston 11, is used for the manually controlled moving-out and moving-in of the rollover bar.

As illustrated particularly in FIG. 1, a holding system 13 for each lowered rollover bar and a locking device 14 for each rollover bar 1 located in the supporting position are supported on the base plate 23 in addition to the control elements 4 and 9.

Figure 3:
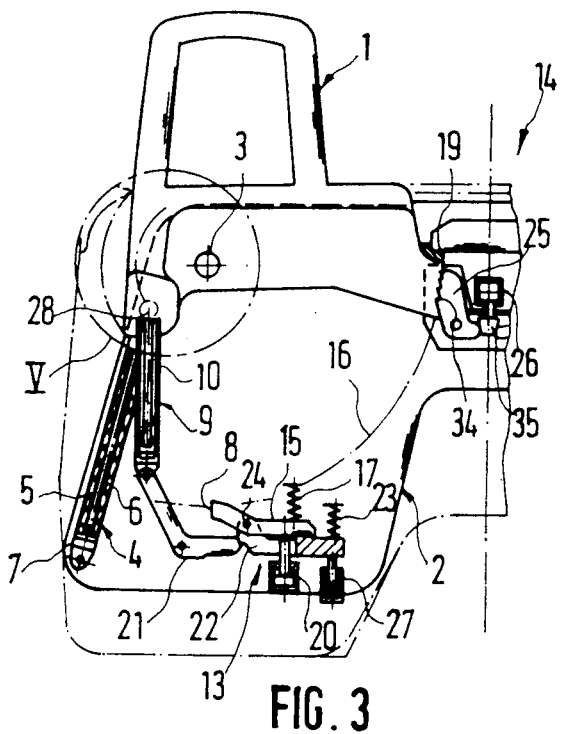
FIG. 3 is a view corresponding to FIG. 2 with an upwardly directed (i.e., supporting position) rollover bar after a manual arbitrary triggering and erecting.
Figure 4:
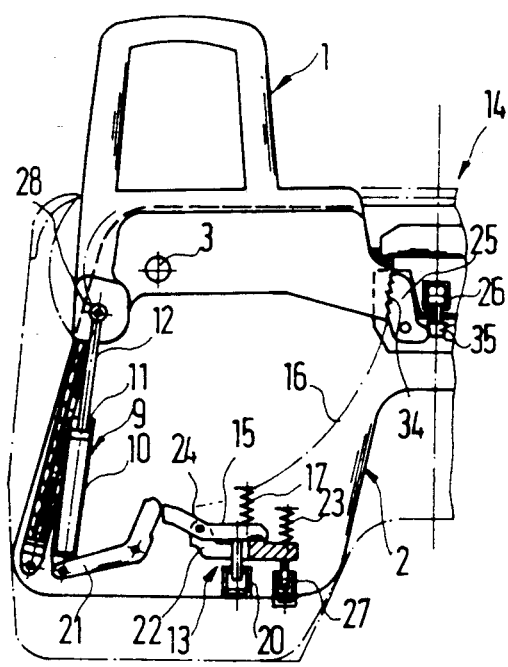
FIG. 4 is a view corresponding to FIG. 3, but after an automatic, sensor-controlled triggering and moving-up of the bar.

In the partially schematic representations according to FIGS. 2 to 4, a holding lever 15 of the holding mechanism 13 projects, in the lowered position of each rollover bar into the moving path 16 of the rollover bar 1 and can be swivelled out of that path against the effect of a spring 17.

In the retracted, lowered position of each rollover bar 1 (FIG. 2), a front side 18 of the holding lever 15 interacts with a corresponding holding projection 19 of the rollover bar 1. The holding lever 15 is a two-armed lever. One lever arm is assigned to the holding projection 19 of the rollover bars 1, and the other lever arm can be acted upon by a control member 20. The control member 20 is a small hydraulic cylinder with a displaceable actuating rod which acts against the lever arm of the holding lever 15 which is on the right in FIG. 2.

The hydraulic cylinder 10 constitutes a selectively controllable control element 9 and is supported with respect to the base plate 2 by way of a rocker 21 which, in turn, can be fixed with respect to the base plate 2 by a supporting lever 22. The rocker 21 is a double-armed rocker with rocker arms at an angle with respect to one another. The hydraulic cylinder 10 is linked to the rocker arm on the left in FIGS. 2 to 4, while the other rocker arm on the right in those figures interacts with the supporting lever 22. The supporting lever 22 can also be swivelled out of its supporting position against the force of a spring 23.

When swivelling out of the supporting position shown in FIGS. 3 and 4, the supporting lever 22 takes along the holding lever 15 and therefore swivels it out of its holding position. The holding lever 15, the rocker 21, the supporting lever 22 and the rollover bar 1 can be swivelled around swivel axes which are in parallel with respect to one another and are approximately perpendicular with respect to the plane of the base plate 2, with the supporting lever 22 and the holding lever 15 having a common swivel axis 24.

When the rollover bars 1 are to be moved out arbitrarily, the holding lever 15, by way of the hydraulically operable control member 20, is swivelled counterclockwise out of its holding position and therefore releases the holding projection 19 of the rollover bar 1. The control element 4 which is under the effect of the pressure spring 6, and the control element 9 comprising the hydraulic cylinder 10 move from the position shown in FIG. 2 into the position shown in FIG. 3 and thus bring the rollover bar 1 into its upwardly directed supporting position in which it is locked by a locking with the detent pawl 25 of the locking device 14.

If subsequently the rollover bar 1 is to be retracted again by manual control, a small control cylinder 26 of the locking device 14 first unlocks the spring-loaded pawl 25, and pressure is supplied to the lower work space of the hydraulic cylinder 10 by suitable and conventional hydraulic control valves which are not illustrated for purposes of clarity. The piston rod 12 moves out and swivels the rollover bar 1 from the erect position shown in FIG. 3 clockwise into the lowered position illustrated in FIG. 2 in which the holding projection 19 of the rollover bar 1 locks with the front side 18 of the spring-loaded holding lever 15.

When the rollover bar 1 is triggered by a sensor detecting a rollover situation, a hydraulic control member 27 is switched which can be acted upon from an accumulator. The switching operation takes place particularly fast, with the actuating rod of this control member 27 swivelling the supporting lever 22 upward with its right end. Because the holding lever 15 is taken along, this causes not only a release of the rollover bar 1 in its lowered position, but also an immediate release of the rocker 21 which had supported the hydraulic cylinder 10 in its lower area. The control element 4 acting under the effect of the pressure spring 6 can therefore, without being hindered by the hydraulic cylinder 10, very rapidly pull the rollover bar 1 downward at its end area situated on the left of the swivel axis 3 according to FIG. 2 and therefore swivel into the supporting position shown in FIG. 4, in which position it is, in turn, securely locked by the detent pawl 25. In this case, a suitable damping may be provided in the control 4 element itself which is operative as a result of the pressure spring 6, or at one of its linking points, in which case a suitable damping may be provided which prevents a springing-back or swinging of the rollover bars 1 if these bars were displaced very rapidly in the extended position.

For the retracting of the rollover bars 1 after a sensor-controlled triggering, the hydraulic cylinder 10 is first moved in, whereby the rocker 21 is rotated clockwise until it locks with the supporting lever 22. Then the condition shown in FIG. 3 exists. Subsequently, the retraction of the rollover bars 1 takes place in the precise manner described above after the release of the detent pawl 25.

As illustrated in FIGS. 2 to 5, the hydraulic cylinder 10 and the control element 4 operating under the effect of the spring 6, by way of a common swivel joint 28, are applied to the rollover bar 1. The rollover bars 1 may be provided with a squeeze protection, for the purpose of which, in the area of the swivel joint 28, a supporting member is provided which, when the rollover bar 1 is retracted, can be displaced to a limited extent against the force of a spring, and which, when it is displaced, actuates a switch 29 which interrupts the retracting movement. When it is actuated, the switch 29 immediately stops the retracting movement of the rollover bar 1. This type of a supporting member which can be displaced against the force of a spring may also be provided at the rocker 21 in the working area of the hydraulic cylinder 10.

Figure 5:
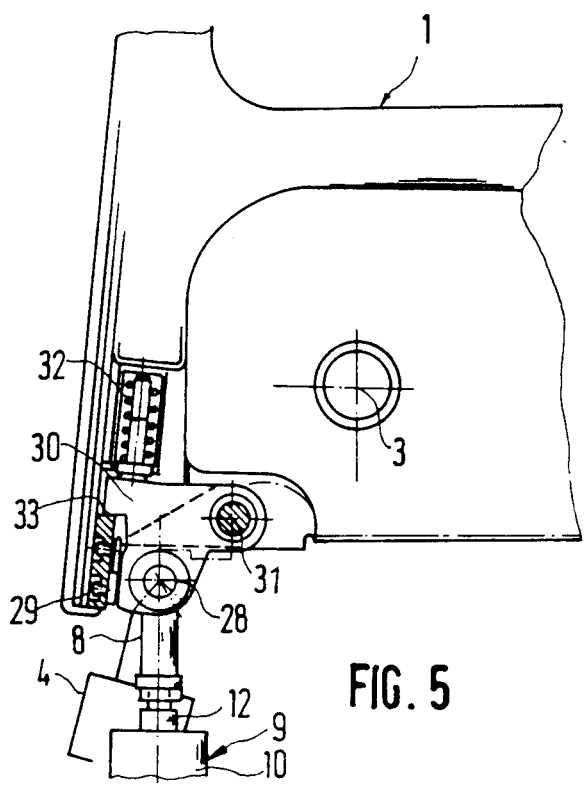
FIG. 5 is an enlargement of a detail in the circled area of FIG. 3.

In the illustrated embodiment according to FIG. 5, the supporting member is an articulated rocker 30 which has the swivel joint 28 and which is disposed so that it can be swivelled to a limited extent around an axis 31 at the rollover bar 1 which is parallel the axis of the swivel joint. The articulated rocker 30 supports itself under the effect of a compression spring 32 against a stop 33 of the rollover bar 1. If there is the risk that a human body part or another object may be squeezed in the course of the movement of the rollover bar 1 from the supporting position shown in FIG. 3 into the lowered position shown in FIG. 2, the articulated rocker 30 is moved against the direction of the pressure spring 32 in FIG. 5, i.e., slightly clockwise away from the stop 33. As a result, the lower area of the articulated rocker 30 having the swivel joint 28 approaches the switch 29 which may be formed by a contact foil. The actuation of the switch 29 causes an immediate stopping of the retracting movement of the rollover bar 1.

According to FIG. 1, the rollover bars 1 are disposed in the upper lateral areas of the base plate 2 and can be fixed in the erect supporting position by a locking device 14 provided in the center of the base plate 2. The locking device 14 has two detent pawls 25 which are assigned to an arcuate tooth contour 34 of each rollover bar 1, respectively. These detent pawls 25 can be swivelled out of their locking position by a common control cylinder 26 as a result of a cone 35 provided at the free end of the actuating rod of the cylinder.

The elements of the drive of the rollover bars 1 can easily be pre-assembled and precisely adjusted at the base plate 2 outside the vehicle. They maintain the set adjustment because the base plate 2 forms a very stable component which may also easily be connected with the vehicle body in the area of the bar bearings, in the area of the locking device 14 as well as in the area of the lower support of the control elements for the rollover bars 1. The arrangement of the control elements and of the rollover bars 1 on the base plate 2 also permits a very space-saving and flat construction of the overall system. Finally, the moving direction of the rollover bars 1 is also favorable with respect to a possible risk of injury of the vehicle occupants which can be reduced further by the described squeeze protection device.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A driving system for each of at least one motor vehicle rollover bar, particularly for a convertible vehicle, which can be displaced from a lowered position to an upwardly directed supporting position and back to the lowered position, comprising a sensor-controlled first control device actuatable under the effect of a spring loading, a second control device which can be controlled in a moving direction, both control devices supporting against the vehicle body, a holding mechanism for the at least one rollover bar in the lowered position is provided at the vehicle body, and a locking device for the at least one rollover bar in the supporting position is also provided at the vehicle body, wherein the at least one rollover bar is disposed on a base plate mounted transversely at the vehicle body.

2. The driving system according to claim 1, wherein the control devices, the holding mechanism and the locking device are arranged on the base plate.

3. The driving system according to claim 1, wherein the at least one rollover bar comprises two rollover bars disposed on the base plate and spaced in the transverse direction of the vehicle so as to be perpendicular to a longitudinal direction of the vehicle.

4. The driving system according to claim 3, wherein the control devices, the holding mechanism and the locking device are arranged on the base plate.

5. The driving system according to claim 1, wherein the holding mechanism comprises a holding lever which, in the lowered position of the at least one rollover bar, projects into a moving path of the at least one rollover bar and can be swivelled out of the moving path.

6. The driving system according to claim 5, wherein the control devices, the holding mechanism and the locking device are arranged on the base plate.

7. The driving system according to claim 6, wherein the at least one rollover bar comprises two rollover bars disposed on the base and spaced in the transverse direction of the vehicle so as to be perpendicular to a longitudinal direction of the vehicle.

8. The driving system according to claim 5, wherein the holding lever can be swivelled out of its holding position against the effect of a spring operatively arranged therein.

9. The driving system according to claim 4, wherein a front side of the holding lever operatively interacts with a corresponding holding projection of the at least one rollover bar.

10. The driving system according to claim 9, wherein the holding lever is a two-armed lever, one lever arm being assigned to the holding projection of the at least one rollover bar, and the other lever arm actuatable by a third control device operatively associated therewith.

11. The driving system according to claim 7, wherein in the third control device is a hydraulic cylinder with a displaceable actuating rod.

12. The driving system according to claim 1, wherein the second control element is supported with respect to the base plate by a rocker which can be fixed with respect to the base plate via a supporting lever.

13. The driving system according to claim 2, wherein the rocker has two rocker arms, to one rocker arm of which the second control device is operatively linked, and the other rocker arm operatively interacts with the supporting lever.

14. The driving system according to claim 12, wherein the supporting lever can be swivelled out of its supporting position against the effect of a spring operatively associated therewith.

15. The driving system according to claim 14, wherein the rocker has two rocker arms, to one rocker arm of which the second control device is operatively linked, and the other rocker arm operatively interacts with the supporting lever.

16. The driving system according to claim 1, wherein the second control element is supported with respect to the base plate by a rocker which can be fixed with respect to the base plate via a supporting lever.

17. The driving system according to claim 16, wherein the supporting lever and holding lever are operatively arranged such that, when the supporting lever is swivelled out of its supporting position, the holding lever is swivelled out of its holding position.

18. The driving system according to claim 16, wherein the holding lever, the rocker, the supporting lever and the at least one rollover bar can be swivelled around parallel swivel axes which are approximately perpendicular with respect to the plane of the base plate.

19. The driving system according to claim 18, wherein the supporting lever and holding lever are operatively arranged such that, when the supporting lever is swivelled out of its supporting position, the holding lever is swivelled out of its holding position.

20. The driving system according to claim 16, wherein the supporting lever and the holding lever have a common swivel axis.

21. The driving system according to claim 1, wherein the second control device is a double-action hydraulic cylinder.

22. The driving system according to claim 21, wherein the hydraulic cylinder and the first control element acting by means of a spring are operatively associated with the at least one rollover bar via a common swivel joint.

23. The driving system according to claim 22, wherein, in an area of one of the swivel joint and support of the hydraulic cylinder on the base plate, a supporting member is operatively arranged to be displaced to a limited extent against a spring force when the at least one rollover bar is retracted toward the lowered position and which, when it is so displaced, actuates a switch which interrupts the retracting movement.

24. The driving system according to claim 23, wherein the supporting member is an articulated rocker which has the swivel joint and is swivelable to a limited extent around an axis on the at least one rollover bar which is parallel to an axis of the swivel joint, and further supports itself against a stop of the at least one rollover bar under the effect of a spring operatively associated therewith.

25. The driving system according to claim 3, wherein the two rollover bars are disposed in upper lateral areas of the base plate and can be fixed in the supporting position by the locking device provided in the center of the base plate.

26. The driving system according to claim 25, wherein the locking device has two spring-loaded detent pawls which are each assigned to an arcuate tooth contour of an associated rollover bar and can be swivelled out of their locking position by a common control means.

* * * * *